United States Patent

Moreno et al.

Patent Number: 6,059,415
Date of Patent: May 9, 2000

[54] EXTERNAL REARVIEW MIRROR WITH A RETENTION DEVICE FOR HOLDING THE MIRROR IN A PREDETERMINED POSITION

[75] Inventors: Ricardo Poveda Moreno; Fábio Koiti Anze; Paulo Roberto Milani, all of Estado de São Paulo, Brazil

[73] Assignee: Metagal Industria e Comercio Ltda, Vila Mary Diadema, Brazil

[21] Appl. No.: 09/200,106

[22] Filed: Nov. 25, 1998

[30] Foreign Application Priority Data

Jan. 29, 1998 [BR] Brazil ..................................... 9800310

[51] Int. Cl.[7] .............................. G02B 5/08; G02B 7/182; B60R 1/06
[52] U.S. Cl. .......................... 359/841; 359/872; 248/477; 248/478; 248/479; 248/483; 248/484; 248/486
[58] Field of Search ..................................... 359/841, 872, 359/881; 248/477, 478, 479, 482, 483, 484, 485, 486

[56] References Cited

U.S. PATENT DOCUMENTS

| | | |
|---|---|---|
| 1,806,059 | 5/1931 | Hoople . |
| 2,860,546 | 11/1958 | Bolser . |
| 3,107,077 | 10/1963 | Lassa . |
| 3,583,734 | 6/1971 | Magi . |
| 3,625,553 | 12/1971 | Mattioli . |
| 4,277,140 | 7/1981 | Manzoni ................................. 359/872 |
| 4,363,534 | 12/1982 | Covert .................................... 359/877 |
| 4,626,083 | 12/1986 | Nakayama et al. ..................... 359/877 |
| 5,432,640 | 7/1995 | Gilbert et al. .......................... 359/872 |

FOREIGN PATENT DOCUMENTS 1814545  9/1970  Germany ................................ 359/841

*Primary Examiner*—Ricky D. Shafer
*Attorney, Agent, or Firm*—Michael J. Striker

[57] ABSTRACT

The rearview mirror, especially for an automobile, has an improved retention device for holding the mirror in a predetermined fixed position. This retention device (6) includes at least one fixing element for securing the mirror supporting arm (3) in a predetermined fixed position relative to its base (4). The fixing element or elements project from an internal surface of the holding member (40) or project from the pivot (30) provided on the supporting arm (3) and each include an elastic element (61) pressing in a radial direction from the holding member (40) toward the pivot (34) or from the pivot (34) to the holding member (40) and a corresponding recess (62) provided in the pivot (30) or in the holding member in which each elastic element (61) engages.

3 Claims, 1 Drawing Sheet

EXTERNAL REARVIEW MIRROR WITH A RETENTION DEVICE FOR HOLDING THE MIRROR IN A PREDETERMINED POSITION

BACKGROUND OF THE INVENTION

1. Field of the Invention

The present invention relates to an external rearview mirror with a retention device, especially for an automobile, and, more particularly, to a retention device for the external rearview mirror of an automobile designed to provide better performance and utilization than the similar prior art devices.

2. Prior Art

External rearview mirrors are already known comprising a mirror; a casing housing the mirror; a supporting arm on which the casing is pivotally mounted at one end thereof; a base mounted on one side of a vehicle including retaining elements or a pivot for pivotally mounting the supporting arm; a torque adjusting device for adjusting a required torque necessary to move the arm in relation to the base and a retention device for securing the arm in a predetermined fixed position relative to the base.

In its known conventional form, the retention device may comprise a frame for adjacent portions of the arm and holding member of the base and arm that mutually interconnect in an axial direction, urged by a spring with a locking device.

This type of retention device, depending of the characteristics of the mirror, may be comparatively complex, so that its manufacture is complicated.

On the other hand, this type of structure for the retention device is subject to the effect of the weight of the arm, casing and mirror and of the vehicle motion.

SUMMARY OF THE INVENTION

Thus, it is an objective of the present invention to provide an external rearview mirror with a retention device with a simplified construction and manufacture in relation to the conventional one.

Another objective of the present invention is to provide a rearview mirror device that is less subject to the effect of its own weight and the vehicle motion.

Another objective of the present invention is to provide a rearview mirror with a retaining device that avoids the above-described disadvantages without increasing the final cost of the mirror.

According to the invention, the external rearview mirror mounted on a side part of a vehicle comprises a mirror plate; a casing housing the mirror plate; a supporting arm having a first end portion on which the casing is pivotally mounted and a pivot at a second end portion thereof opposite to the first end portion; a base provided with a holding member on one end thereof in which the pivot and thus the supporting arm is pivotally mounted, the base being attached to a side part of the vehicle; torque adjusting means for adjusting a torque required to move the supporting arm held in the holding member in relation to the base and a retention device for securing the supporting arm in a predetermined fixed position in relation to the base.

The objects of the invention are attained and the above-described disadvantages are eliminated when the retention device comprises at least one fixing element for securing the supporting arm in a predetermined fixed position relative to the base, each fixing element projecting from an internal surface of the holding member or projecting from the pivot of the supporting arm and each comprising an elastic element pressing in a radial direction from the holding member toward the pivot or from the pivot to the holding member, and a corresponding recess provided in the pivot or in the holding member in which the elastic element engages.

In this way, the rearview mirror according to the invention overcomes the disadvantages of the invention and has an extremely simple structure and operation.

On the other hand, the retention device according to the invention, in any of its various embodiments, provides a retention force in a transverse direction with relation to the interconnected portions of the arm and base that provides better assistance in counteracting the effects of its own weight and the conditions of use of the same.

Various preferred embodiments are described in the description and claimed in the dependent claims appended hereinbelow.

BRIEF DESCRIPTION OF THE DRAWING

The objects, features and advantages of the invention will now be illustrated in more detail with the aid of the following description of the preferred embodiments, with reference to the accompanying Figures in which.

DESCRIPTION OF THE PREFERRED EMBODIMENTS

Figure 1:
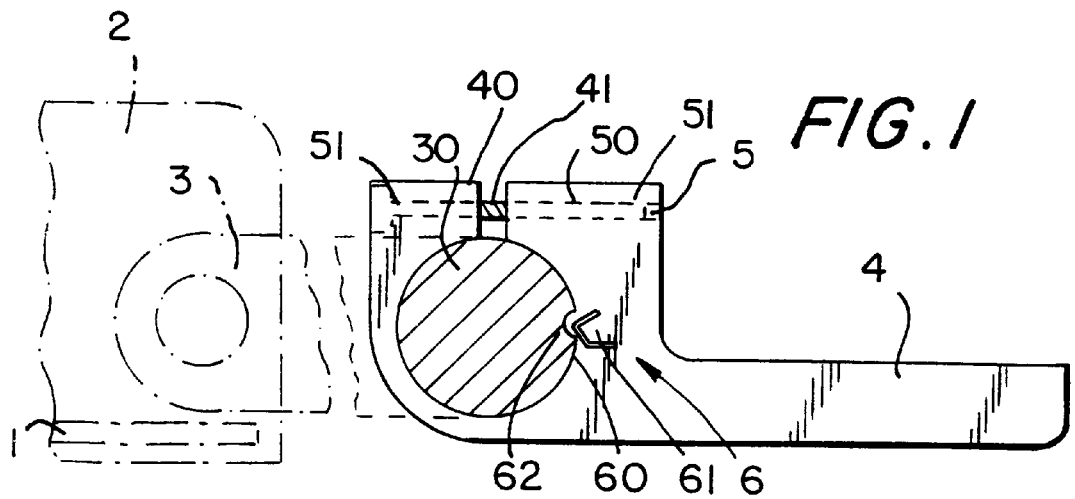
FIG. 1 is a cross-sectional view through a rearview mirror with a retention device according to the invention.

The retention device, object of the present patent, is part of a rearview external mirror of the type comprising, as shown in FIG. 1, a mirror plate 1, a casing 2 housing the mirror plate, a supporting arm 3, on one end of which the casing 2 is pivotally mounted, and a base 4 mounted on one side of a vehicle in which supporting arm 3 is pivotally mounted with another end opposite to the end engaged with the casing; a torque adjusting device 5 for setting a required torque necessary to move the supporting arm 3 in relation to the base and a retention means 6 for securing the supporting arm 3 in a predetermined fixed position in relation to the base 4.

The base 4 may be of the type that is provided with a longitudinal slot 41 provided in a holding member 40 that receives the pivot 30 of the supporting arm 3.

The torque adjusting device 5 can comprise a bolt or screw 50 extending in tangential direction with relation to or through the holding member 40. The bolt extends across the longitudinal slot 41 and engages in threaded hole 51 in the adjacent holding member that receives the bolt 50.

The improved retention means 6 according to the invention comprises fixing means 60 projecting from an internal surface of the holding member 40 of the base 4 or projecting out from the pivot 30 of the supporting arm 3. This fixing means 60 includes an elastic element 61 pressing in a radial direction into the holding member 40 or the pivot 30 and a corresponding recess 62 made in the external surface of the pivot 30 or an internal surface of the holding member 40, respectively, that receives the elastic element 61.

In a preferred embodiment the fixing means 60 comprises a laminated spring (elastic element 61) provided with "V"

section and a vertex, which is secured in a recess in the internal surface of the holding member 40, and a corresponding groove 62 in the pivot 30, in which the vertex of the spring 61 is held.

The necessary torque required to move the supporting arm 3 in relation to the base 4 is adjusted by turning the bolt or screw 50 one way or the other. The supporting arm 3 is secured in relation to the base 4 by inserting the vertex of the spring 61 in the corresponding groove 62 of the supporting arm 3.

Within the basic conception, described above, it is to be understood that the retention device, object of the present patent, might be modified with relation to materials, dimensions and structural details without escaping from the ambit of the required protection.

Within the broad concept of the present invention, in another embodiment (FIG. 2), the retention means 6 includes a transverse throughgoing passage 63 provided through the pivot 30 of the supporting arm 3, two steel spheres 60' lodged in the respective extremities of the throughgoing passage 63, helical spring 61' held inside the throughgoing passage and inserted in the spheres 60' and longitudinally opposed grooves 62' provided in an inner surface of the holding member 40' which receive the respective spheres.

Figure 3:
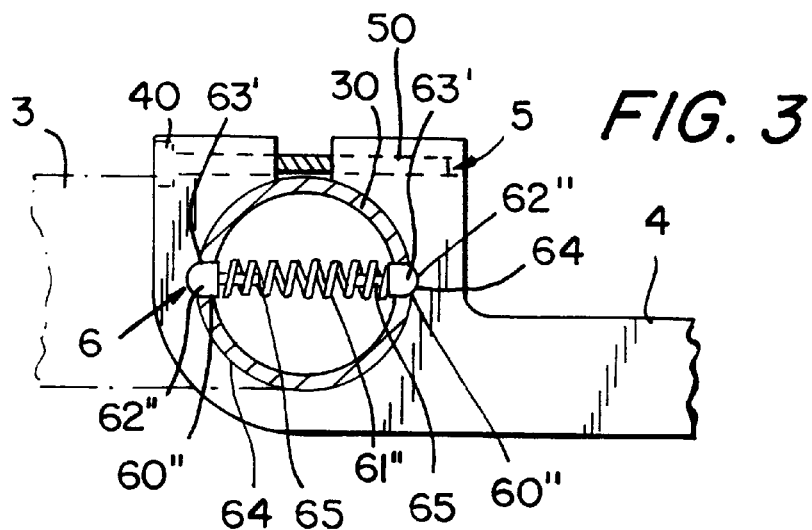
FIG. 3 is a cross-sectional view through a third embodiment of a rearview mirror with a retention device according to the invention.

In another embodiment of the invention, which is better in the case when the pivot 30 of the supporting arm 3 is tubular (FIG. 3), the retention means 6 includes radially arranged transverse holes 63' made in regions that are diametrically opposed to pivot 30; two pins 60" arranged in the respective transverse holes 63' and each comprising a head 64 having spherical end portion extending out of the pivot and a stem 65 extending in an axial direction opposite from the spherical end portion and directed inwardly; a helical spring 61" inserted between the pins 60" and supported on the internal ends of the heads 64 of the pins extending around the stems 65 of the pins and opposed longitudinal grooves 62" made in an inner surface of the holding member in which the respective heads 64 of the pins 60" are held.

In this way the spheres 60' or heads 64 of the pins 60" in the arm 3 are urged into the grooves 62', 62" of the base 4 by the springs 61', 61", thus holding the parts of the mirror in a predetermined configuration. The stems 65 of the pins 60" support the spring 61" so that the spring does not buckle.

In another embodiment, with which various versions of the retention device can be used, the base 4 can be of the type that becomes part of the closed holding member 40' along its entire perimeter and the base receives the pivot 30 of the supporting arm 3.

Figure 2:
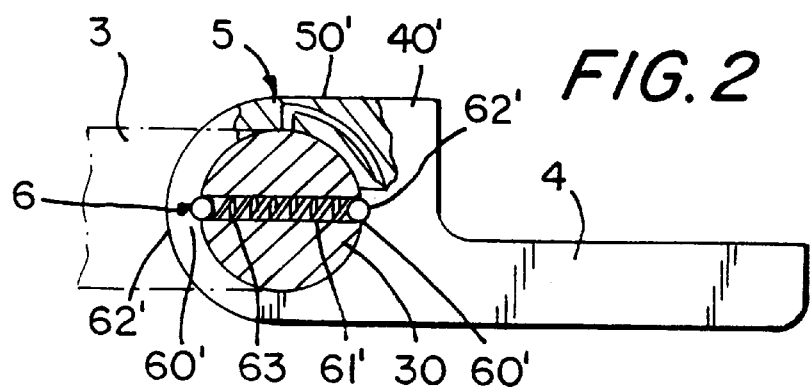
FIG. 2 is a cross-sectional view through a second embodiment of a rearview mirror with a retention device according to the invention.

In another embodiment the torque adjusting device 5 comprises at least one resilient tongue 50' in a section of the holding member 40,40' (shown in FIG. 2). Each resilient tongue in this embodiment has two parallel sections interconnected by a transverse section and remains pressed against the surface of the pivot 30.

The disclosure in Brazilian Patent Application PI 98.00310-0 of Jan. 29, 1998 is incorporated here by reference. This Brazilian Patent Application describes the invention described hereinabove and claimed in the claims appended hereinbelow and provides the basis for a claim of priority for the instant invention under 35 U.S.C. 119.

While the invention has been illustrated and described as embodied in an external rearview mirror with a retention device for holding the mirror in a predetermined position, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An external rearview mirror mounted on a side part of a vehicle, said external rearview mirror comprising a mirror plate (1);

a casing (2) housing the mirror plate (1);

a supporting arm (3) having a first end portion on which the casing (2) is pivotally mounted and a pivot (30) at a second end portion thereof opposite to the first end portion;

a base (4) provided with a holding member (40) on one end thereof in which said pivot (30) and thus said supporting arm is pivotally mounted to pivot about a pivot axis extending axially through said pivot (30), said base (4) being mounted on said side part of the vehicle;

torque adjusting means (5) for adjusting a torque required to move the supporting arm (3) held in the holding member in relation to the base (4); and a retention device (6) for securing the supporting arm (3) in a predetermined fixed position in relation to the base (4);

wherein the retention device (6) comprises at least one fixing element (60) for securing the supporting arm (3) in the predetermined fixed position relative to the base (4), said at least one fixing element (60) projecting from an inner surface of the holding member (40) facing the pivot and comprising an elastic element (61) pressing in a radial direction from the holding member (40) toward the pivot (30) and a corresponding recess (62) provided in the pivot (30); and wherein said elastic element (61) comprises a laminated spring having a "V" section with a vertex and projecting from said inner surface of the holding member (40) and the vertex of the laminated spring engages in the corresponding recess (62).

2. An external rearview mirror mounted on a side part of a vehicle, said external rearview mirror comprising a mirror plate (1);

a casing (2) housing the mirror plate (1);

a supporting arm (3) having a first end portion on which the casing (2) is pivotally mounted and a pivot (30) at a second end portion thereof opposite to the first end portion;

a base (4) provided with a holding member (40) on one end thereof in which said pivot (30) and thus said supporting arm is pivotally mounted to pivot about a pivot axis extending axially through said pivot (30), said base (4) being ii mounted on said side part of the vehicle;

torque adjusting means (5) for adjusting a torque required to move the supporting arm (3) held in the holding member in relation to the base (4); and a retention device (6) for securing the supporting arm (3) in a predetermined fixed position in relation to the base (4);

wherein the retention device (6) comprises a transverse diametrically throughgoing passage (63) provided in the pivot (30) of the supporting arm (3), opposing longitudinal grooves (62') provided in an inner surface of the holding member (40') on respective opposite sides of the pivot (30), two steel spheres (60') lodged in respective end portions of the throughgoing passage (63) and a helical spring (61') arranged within the throughgoing passage (63) to urge the two steel spheres (60') into the respective opposing longitudinal grooves (62').

3. An external rearview mirror mounted on a side part of a vehicle, said external rearview mirror comprising a mirror plate (1);

a casing (2) housing the mirror plate (1);

a supporting arm (3) having a first end portion on which the casing (2) is pivotally mounted and a pivot (30) at a second end portion thereof opposite to the first end portion;

a base (4) provided with a holding member (40) on one end thereof in which said pivot (30) and thus said supporting arm is pivotally mounted to pivot about a pivot axis extending axially through said pivot (30), said base (4) being mounted on said side part of the vehicle;

torque adjusting means (5) for adjusting a torque required to move the supporting arm (3) held in the holding member in relation to the base (4); and a retention device (6) for securing the supporting arm (3) in a predetermined fixed position in relation to the base (4);

wherein said pivot (30) is tubular and said retention device (6) includes transverse holes (63') provided in the holding member (40) in regions that are diametrically opposed to the tubular pivot (30); two pins (60") accommodated in the respective transverse holes (63'), each of said pins (60") comprising a head (64) having a spherical end portion extending out of the pivot and a stem (65) extending in an axial direction opposite from the spherical end portion and directed inwardly into the pivot; a helical spring (61") connected between the pins (60") braced against the heads (64) of the pins and surrounding the stems (65) of the pins and by opposed longitudinal grooves (62") in said inner surface of the holding member (40) in which the respective heads (64) of the pins (60") engage.

\* \* \* \* \*